US008843913B2

(12) United States Patent
Lueh et al.

(10) Patent No.: US 8,843,913 B2
(45) Date of Patent: Sep. 23, 2014

(54) DYNAMIC LINKING AND LOADING OF POST-PROCESSING KERNELS

(75) Inventors: Guei-Yuan Lueh, San Jose, CA (US); Xiaoying He, Palo Alto, CA (US); Xuefeng Zhang, Beijing (CN); Yuenian Yang, Granite Bay, CA (US); Ping Liu, Sunnyvale, CA (US); Hong Jiang, El Dorado Hills, CA (US); Maxim Lukyanov, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1398 days.

(21) Appl. No.: 11/758,437

(22) Filed: Jun. 5, 2007

(65) Prior Publication Data

US 2008/0307404 A1 Dec. 11, 2008

(51) Int. Cl.
*G06F 9/44* (2006.01)
*G06F 9/445* (2006.01)
*G06F 9/45* (2006.01)

(52) U.S. Cl.
CPC .............. *G06F 9/44521* (2013.01); *G06F 8/41* (2013.01); *G06F 9/44111* (2013.01)
USPC ....................................................... 717/162

(58) Field of Classification Search
CPC ...... G06F 8/41; G06F 9/44521; G06F 9/4411
USPC ........................................................ 717/162
See application file for complete search history.

(56) References Cited

U.S. PATENT DOCUMENTS

| | | | |
|---|---|---|---|
| 6,490,721 B1 * | 12/2002 | Gorshkov et al. | 717/130 |
| 2005/0138611 A1 * | 6/2005 | Inglis et al. | 717/151 |
| 2007/0006201 A1 * | 1/2007 | Axnix et al. | 717/162 |
| 2007/0041610 A1 | 2/2007 | Kaneko et al. | |

FOREIGN PATENT DOCUMENTS

| | | |
|---|---|---|
| CN | 101320332 B | 7/2012 |
| DE | 10 2008 024 521 B4 | 5/2011 |
| JP | 02-231604 A | 9/1990 |
| JP | 05-289858 A | 11/1993 |
| JP | 2006338507 A | 12/2006 |
| JP | 2008305398 A | 12/2008 |
| TW | 480862 B | 3/2002 |
| TW | I252978 B | 4/2006 |
| TW | 200912796 | 3/2009 |
| WO | 2006/015107 A | 2/2006 |

OTHER PUBLICATIONS

Eppstein, David, "GPGPU." Wikipedia.org. May 20, 2007, http://en.wikipedia.org/w/index.php?title=GPGPU&oldid=132247297.
Yerrick, Damian. "Overlay (programming)." Wikipedia.org, Mar. 11, 2007, http://en.wikipedia.org/w/index.php?title=Overlay_(programming)&oldid=1143964.

(Continued)

*Primary Examiner* — John Chavis
(74) *Attorney, Agent, or Firm* — Ryder, Lu, Mazzeo and Konieczny, LLC

(57) ABSTRACT

A computer system may generate a plurality of component kernels, which are to be linked during the runtime. The system may determine whether a combined kernel K is present in response to receiving a first request to retrieve the combined kernel K. The system may compose the combined kernel K from the selected component kernels of the plurality of component kernels during the runtime if the combined kernel is not already present.

20 Claims, 4 Drawing Sheets

(56) References Cited

OTHER PUBLICATIONS

"Library (computing)," Wikipedia.org. May 31, 2007. http://en.wikipedia.org/w/index.php?title=Library_(computing)&oldid=134830031.

Office Action from German Application No. 102008024521.6, May 19, 2010, 6 pages.

Office Action from German Application No. 102008024521.6, Aug. 17, 2009, 5 pages.

"The Role of Software Packaging in the Patch Management Process," Altiris, Mar. 15, 2006, 14 pages.

Office Action from Chinese Patent Application No. 200810110381.3 mailed Sep. 10, 2010, 7 pages.

Office Action for German Patent Application No. 102008024521 mailed Jul. 21, 2010, 5 pages.

Tan, et al., "A Support Vector Machine with a Hybrid Kernel and Minimal Vapnik-Chervonenkis Dimension," IEEE Transactions on Knowledge and Data Engineering, vol. 16, No. 4, Apr. 2004, 11 pages.

Pharr, et al."GPU Gems 2 Japanese version—Programming Techniques for High Performance Graphics and GPGPU", Initial Version, Dec. 25, 2005, Born Digital Inc., pp. 428-431,483-485, ISBN:4-939007-95-2.

Office Action received for Japanese Patent Application No. 2008-135731, mailed on Aug. 16, 2011, 8 pages of Office Action and 4 pages of English Translation.

Office Action received for Taiwan Patent Application No. 97118793, mailed on Oct. 1, 2012, 6 pages of office action 7 pages of English Translation.

* cited by examiner

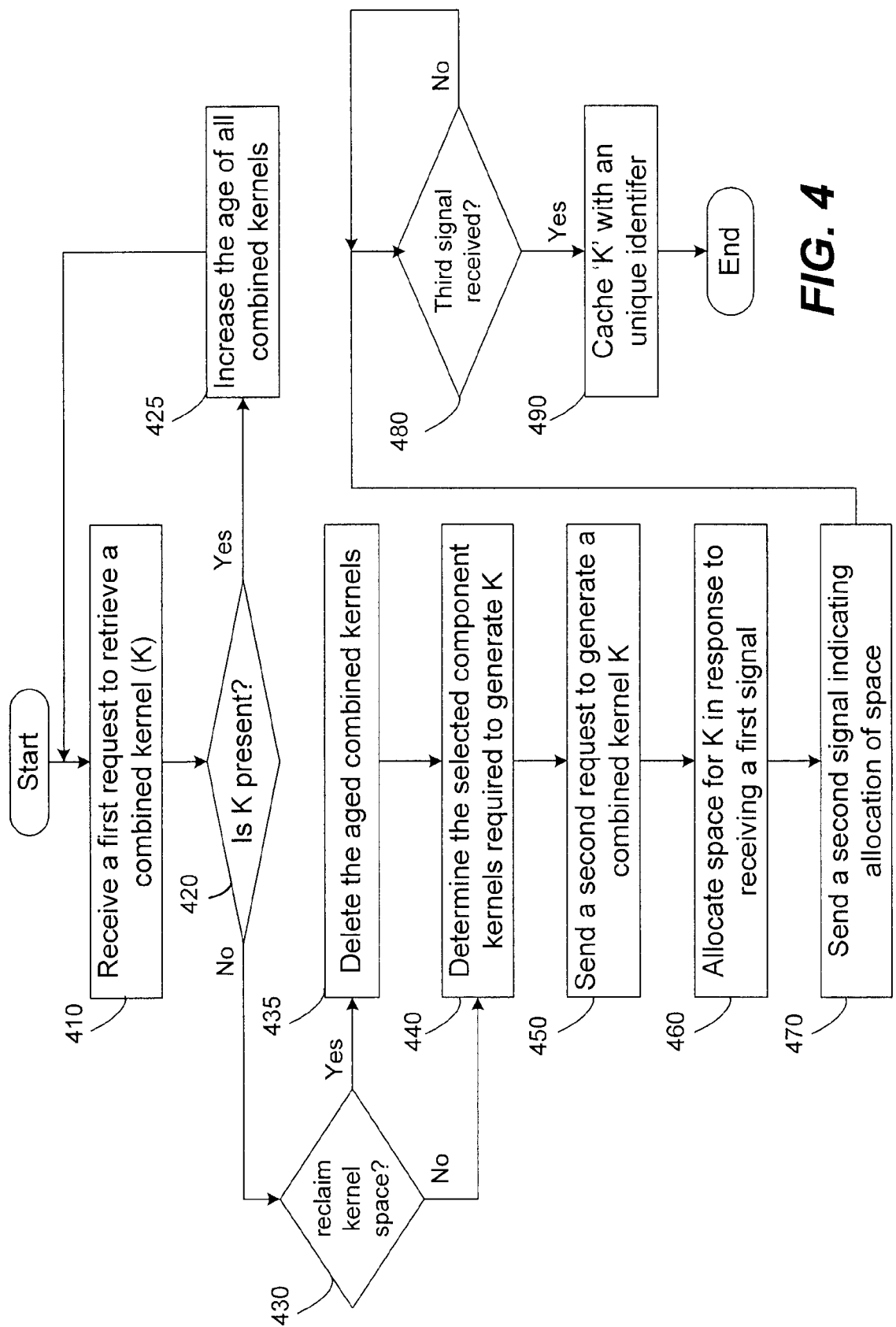

US 8,843,913 B2

DYNAMIC LINKING AND LOADING OF POST-PROCESSING KERNELS

BACKGROUND

A computer system generally comprises processing devices, memory devices, interface devices, and input-output (I/O) devices. While processing video signals, the computer system may perform post-processing functions such as film mode detection, de-interlacing, ProcAmp control adjustment, video scaling, alpha bending, and color space conversion. A plurality of independent kernels may be developed each of which may comprise one or more of the post-processing functions listed above. Each of the plurality of kernels may occupy dedicated memory locations in the memory to read input data and write results. However, communicating data between different post-processing functions via memory may consume higher processor cycles.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 illustrates an operation of an embodiment of a code manager of FIG. 2.

DETAILED DESCRIPTION

The following description describes a system for dynamic linking and loading of post-processing kernels. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
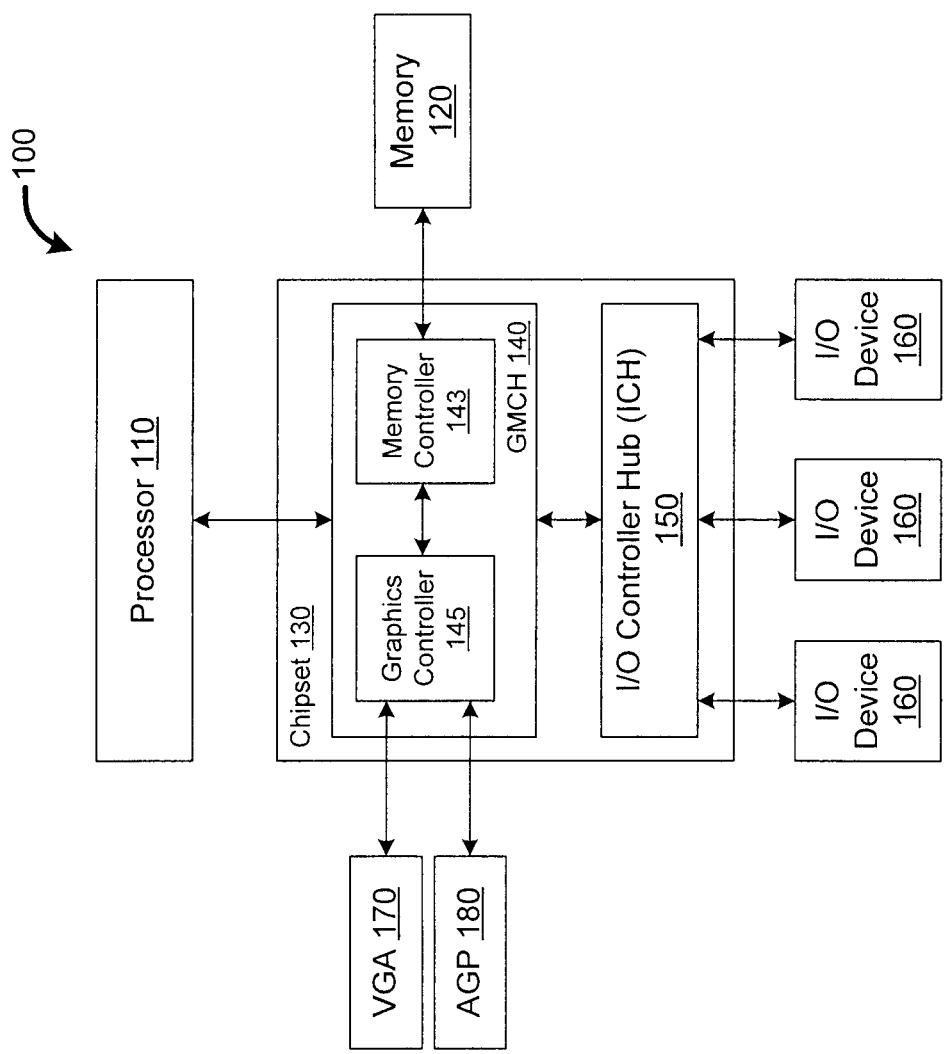
FIG. 1 illustrates an embodiment of a computer system.

An embodiment of a computer system 100 is illustrated in FIG. 1. The computer system 100 may comprise a processor 110, a memory 120, a chipset 130, one or more I/O devices 160, video graphics array (VGA) interface 170, and an accelerated graphics port (AGP) interface 180.

The processor 110 may manage various resources and processes within the computer system 100 and may execute software instructions as well. The processor 110 may comprise, for example, one or more microprocessors from the Pentium®, or Itanium® family of Intel® microprocessors. The processor 110 may interface with the chipset 130 to retrieve from the memory 120 and to store data into the memory 120.

The memory 120 may store data and instructions and may comprise one or more different types of memory devices such as DRAM (Dynamic Random Access Memory) devices, SDRAM (Synchronous DRAM) devices, DDR (Double Data Rate), or other volatile and non-volatile memory devices used in computers.

The I/O device 160 may comprise devices such as a keyboard, mouse, a network interface device, and such other devices. The data units may be transferred between the chipset 130 and the I/O devices 160 over buses comprising peripheral component interconnect (PCI), serial advanced technology attachment (SATA), low pin count (LPC), integrated device electronics (IDE), and such other interconnect technologies.

The chipset 130 may comprise one or more integrated circuits or chips that couple the processor 110, the memory 120, the I/O devices 160, the VGA interface 170, and the AGP interface 180. The chipset 130 may be one of the Intel® families of chipsets. In one embodiment, the chipset 130 may comprise a memory controller hub 143, a graphics and memory controller hub (GMCH) 145 and an I/O controller hub (ICH) 150. The ICH 150 may provide an interface between I/O devices 160 coupled to the ICH 150 and the processor 110 and the memory 120. For example, the ICH 150 may support, for example, hard disk drive, floppy drive, CD drives, modems, keyboards, printers, mouse, endpoints, Ethernet and SCSI devices. The MCH 143 may provide interface between the processor 110 and the memory 130.

In one embodiment, the GMCH 145 may process the transactions and transfer the corresponding data between the memory 120, the ICH 150, the processor 110, and the devices coupled to the VGA interface 170 and the AGP interface 180.

In one embodiment, the GMCH 145 may support dynamic linking and loading of post-processing kernels. In one embodiment, the video post-processing kernels may comprise an ordered sequence of two or more post-processing functions such as film mode detection, de-interlacing, ProcAmp control adjustment, video scaling, alpha bending, and color space conversion.

For example, a first combined kernel K1 may comprise post-processing functions such as film mode detection, de-interlacing, and alpha bending in the same order. A second combined kernel K2 may comprise post-processing functions such as film-mode detection, de-interlacing, video scaling, and color space conversion in the same order. In one embodiment, the combined kernels K1 and K2 may be composed before the kernel is about to be called by. As a result, the dedicated space required to store each of the statically composed kernels may be avoided. In one embodiment, the post processing functions required to form a combined kernel may be identified during the compilation time and the post-processing functions may be linked together dynamically to form a combined kernel during the run time.

Figure 2:
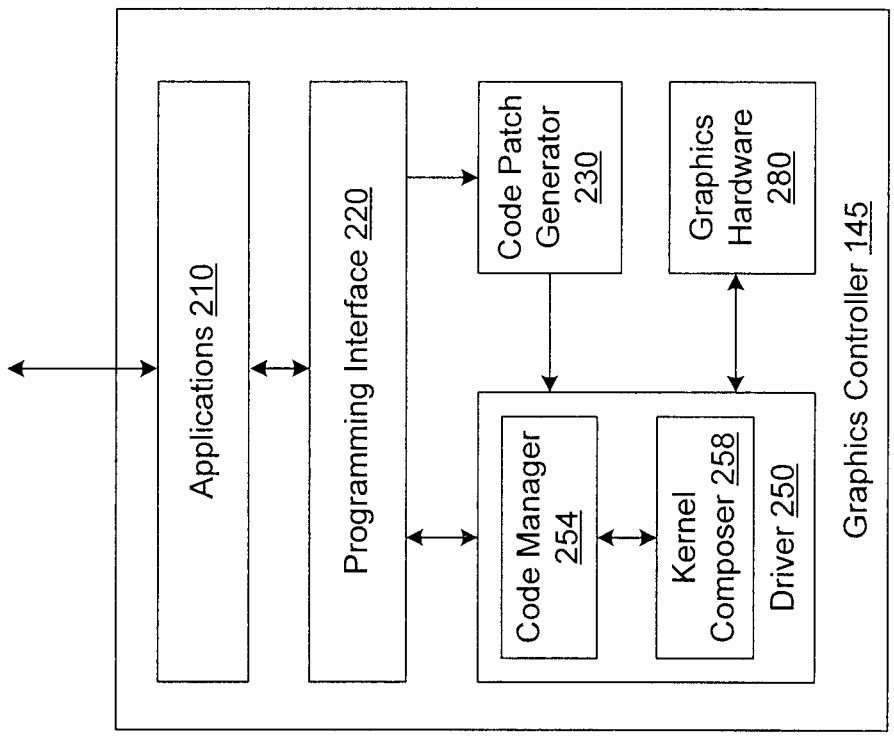
FIG. 2 illustrates an embodiment of a graphics memory controller hub (GMCH) of FIG. 1.

An embodiment of the GMCH 145 supporting dynamic linking and loading of post-processing kernels is depicted in FIG. 2. In one embodiment, the GMCH 145 may comprise applications 210, a programming interface 220, a code patch generator 230, a driver 250 and a graphics hardware 280. In one embodiment, the graphics hardware 280 may interface with driver 250 to perform the functions indicated by the driver 250. In one embodiment, the graphics hardware 280 may comprise one of a family of Intel® Integrated Graphics controller.

In one embodiment, the applications 210 may comprise multimedia applications with which the user of the computer system 100 may interact. In one embodiment, the programming interface 220 may comprise one or more routines that may be used by the applications 210 to interact with the lower-level services provided by an underlying operating system.

In one embodiment, the programming interface 220 may provide a programming interface between the applications 210 and the code patch generator 230 and the driver 250. In one embodiment, the programming interface 220 may provide a post-processing function request to the driver 250 based on the input values received from the applications 210. In one embodiment, the programming interface 220 may comprise Microsoft® DxVA (Direct X video acceleration) programming interface.

In one embodiment, the code patch generator 230 may compile each component kernel statically to a binary along with an auxiliary code patch that may facilitate dynamic linking during the run-time. The binary and the auxiliary code patches may be loaded into the kernel composer 258 of the driver 250 during the set-up time of the driver 250. In one embodiment, the code patch generator 230 may specify the I/O regions, which a first component kernel may use to read and write data. However, the code patch generator 230 may not specify with which other component kernels the first component kernel may be linked up with and such linking of component kernels may happen during the run-time.

The driver 250 may interface the upper layers such as applications 210 to the graphics hardware 280. In one embodiment, the driver 250 may comprise a code manager 254 and a code composer 258. In one embodiment, the driver 250 may comprise one of a family of Intel® graphics drivers.

In one embodiment, the code manager 254 may receive a retrieve request from the programming interface 220 to retrieve a specified combined kernel. The code manager 254 may determine if the specified combined kernel is present in the database supported by the code manager 254. The code manager 254 may send a signal to the programming interface 220 indicating the presence of the specified combined kernel if the specified kernel is present in the database. The code manager 254 may send a request to the code composer 258 to compose the specified kernel if the specified combined kernel is not present. In one embodiment, the code manager 254 may also determine the component kernels required to compose the specified combined kernel.

In one embodiment, the code manager 254 may allocate space to store the newly composed specified combined kernel in response to receiving a request to allocate space for the newly composed specified combined kernel. In one embodiment, the code manager 254 may store the newly composed specified combined kernel and may also allocate a unique identifier to the newly composed specified combined kernel in response to receiving a signal, which indicates that the specified combined kernel is composed. In one embodiment, the code manager 254 may also manage the space for storing the combined kernels by deleting the aged combined kernels.

In one embodiment, the code composer 258 may receive a signal to compose the specified combined kernel. The code composer 258 may also receive the component kernels required to compose the specified combined kernel. In one embodiment, the code composer 258 may determine the space that may be required to store the newly composed specified combined kernel and may send a request to allocate the space.

In one embodiment, the code composer 258 may compose the combined kernel by determining the I/O register regions specified for each component kernel. In one embodiment, the code composer 258 may retrieve and copy the binary files of the component kernels to the allocated space. The code composer 258 may also apply associated code patches to fix the binary files to read input data from the input register regions and write output to the output register regions. The code composer 258 may send a signal indicating that the specified combined kernel is composed.

Figure 3:
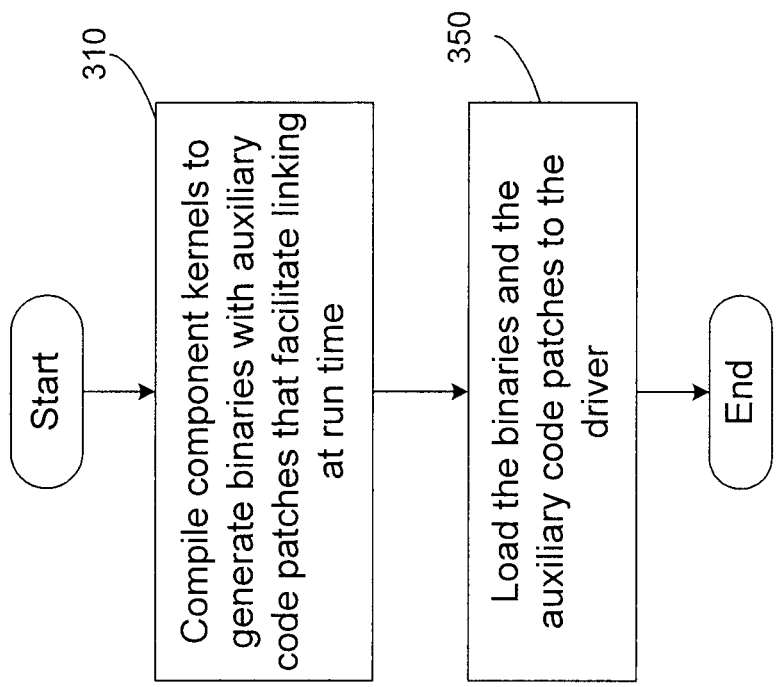
FIG. 3 illustrates an operation of an embodiment of a code patch generator of FIG. 2.

An embodiment of an operation of the code patch generator 230 is illustrated in FIG. 3. In block 310, the code patch generator 230 may compile component kernels to generate binaries along with auxiliary code patches that facilitate linking at run time. In one embodiment, the code patch generator 230 may comprise a Gen4 assembler, which may a use a '.declare' syntax. In one embodiment, the Gen4 assembler use '.declare' syntax to identify the instructions that read data from the preceding kernel and the instructions that write data to the successive kernel. In one embodiment, '.declare' syntax for input and output regions may equal:

.declareINBase=r4,Elementsize=4,Type=d,Width(8),Height(4)PP_IN

.declareOUTBase=r8,Elementsize=4,Type=d,Width(8),Height(4)PP_OUT

In one embodiment, the PP_IN and PP_OUT indicate that '.declare' is used to access the data generated by the preceding kernel and the write data region to write the output data, which may be read by the successive kernel. The contents of PP_IN and PP_OUT may be set to a default value until the runtime. The real values determined during the runtime may be used to configure the contents of PP_IN and PP_OUT. In one embodiment, the Gen4 assembler may track '.declare' with PP_IN and PP_OUT before generating the auxiliary code patch.

In block 350, the code patch generator 230 may load the binaries and the auxiliary code patches to the driver 250.

An embodiment of an operation of the code manager 254 is illustrated in FIG. 4. In block 410, the code manager 254 may receive a first request to retrieve a combined kernel K. In block 420, the code manager 254 may check whether the combined kernel K is present and control passes to block 425 if the combined kernel K is present and to block 430 otherwise.

In block 425, the code manager 254 may increase the age of all the existing combined kernels. Such an approach may allow identification of the combined kernels that are recently used. In one embodiment, the combined kernels with lesser age value are the recently used combined kernels.

In block 430, the code manager 254 may determine if the kernel space is to be reclaimed and control passes to block 435 if the kernel space is to be reclaimed and to block 440 otherwise.

In block 435, the code manger 254 may delete the combined kernels of age greater than a threshold age value. In one embodiment, the code manager 254 may compare the age of each combined kernel with a threshold age value to determine whether the age of the combined kernel is greater than the threshold age value.

In block 440, the code manager 254 may determine the selected component kernels that are required to generate the combined kernel K. In block 450, the code manager 254 may send a second request to compose the combined kernel K along with the selected component kernels. In one embodiment, the code manager 254 may send the second request to the code composer 258 in the form of a bool array. For example, the bool array may equal bool component_kernels [list of component kernels]. The component kernels may be selected if the component kernel boolean values are true.

In block 460, the code manager 254 may allocate space to store the combined kernel K in response to receiving a first signal from the code composer 258. In block 470, the code manager 254 may send a second signal indicating that the space for storing the combined kernel K is allocated.

In block 480, the code manager 254 may check if a third signal that indicates whether the combined kernel is composed is received and control passes to block 490 if the combined kernel K is composed and to block 480 otherwise.

In block 490, the code manager 254 may cache or store the combined kernel K with a unique identifier assigned to the combined kernel K.

Figure 5:
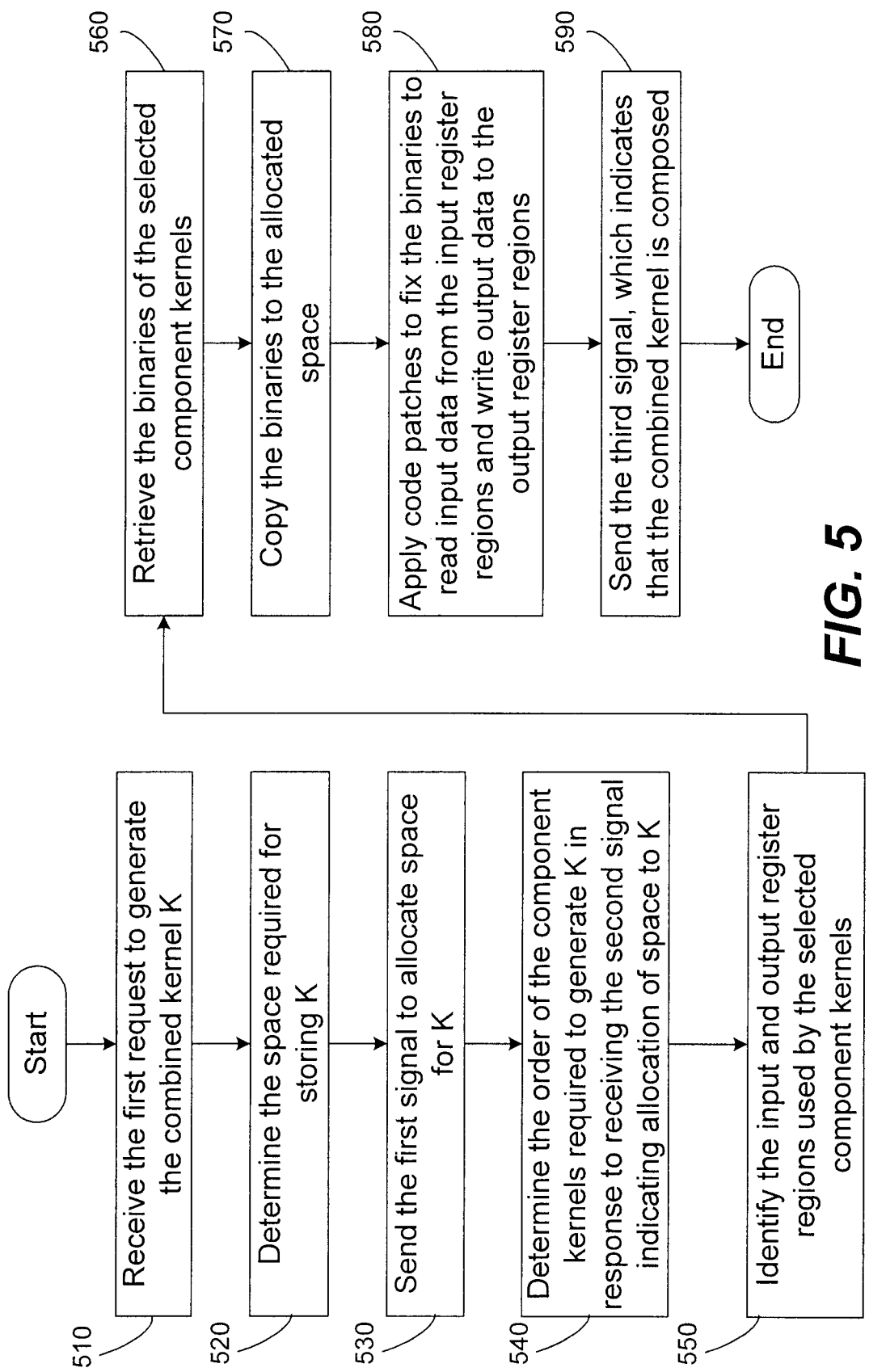
FIG. 5 illustrates an operation of an embodiment of a kernel composer of FIG. 2.

An embodiment of an operation of the code composer 258 is illustrated in FIG. 5. In block 510, the code composer 258 may receive the first request to generate the combined kernel K. In block 520, the code composer 258 may determine the space required to store the combined kernel K.

In block 530, the code composer 258 may send the first signal to allocate space for the combined kernel K. In block 540, the code composer 258 may determine the order of the selected component kernels to generate the combined kernel K after receiving the second signal, which indicates that the space required for storing the combined kernel K is allocated.

In block 550, the code composer 258 may determine the input and output register regions used by the selected component kernels. In block 560, the code composer 258 may retrieve the binaries of the selected component kernels.

In block 570, the code composer 258 may copy the binaries to the allocated space. In block 580, the code composer 258 may apply the code patches to fix the binaries to read the input data from the input register region and write the output data to the output register region.

In block 590, the code composer 258 may send a third signal, which indicates that the combined kernel K is composed. Such a signal may be sent to the code manager 254.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
receiving a request for a combined video post processing kernel, wherein the combined video post processing kernel identifies a plurality of component video post processing kernels and an order, and wherein each of the plurality of post processing kernels defines post processing functions to be performed;
determining if the combined video post processing kernel is available; and
if the combined video post processing kernel is not available, dynamically linking and loading the plurality of component video post processing kernels in the order identified to create the combined video post processing kernel.

2. The method of claim 1, further comprising
allocating space for the combined video post processing kernel;
retrieving binaries and code patches for the component video post processing kernels included in the combined video post processing kernel;
copying the binaries to the allocated space; and
applying the code patches.

3. The method of claim 2, further comprising determining input register regions and output register regions for the component video post processing kernels included in the combined video post processing kernel and wherein the applying the code patches includes fixing the binaries to read input data from the input register regions and write output data to the output register regions.

4. The method of claim 2, further comprising
storing the combined video post processing kernel; and
assigning a unique identifier to the combined video post processing kernel.

5. The method of claim 2, wherein the allocating includes
determining if sufficient space is available for the combined video post processing kernel; and
if sufficient space is not available, deleting other combined video pot processing kernels.

6. The method of claim 5, wherein the deleting includes deleting least recently used other combined video post processing kernels.

7. The method of claim 1, further comprising storing a plurality of component video post processing kernels, wherein at least a subset of the plurality of component video post processing kernels may be linked together in a certain order to define a combined video post processing kernel.

8. The method of claim 7, further comprising generating the plurality of component video post processing kernels, wherein each of the component video post processing kernels includes binaries with code patches that read data from a preceding kernel and write data into a successive kernel at runtime.

9. A non-transitory machine readable medium comprising a plurality of instructions, wherein when the instructions are executed they result in a computing device:
receiving a request for a combined video post processing kernel, wherein the combined video post processing kernel identifies a plurality of component video post processing kernels and an order, and wherein each of the plurality of post processing kernels defines post processing functions to be performed;

determining if the combined video post processing kernel is available; and if the combined video post processing kernel is not available, dynamically linking and loading the plurality of component video post processing kernels in the order identified to create the combined video post processing kernel.

10. The non-transitory machine readable medium of claim 9, wherein when executed the instructions further result in the computing device:

allocating space for the combined video post processing kernel;

retrieving binaries and code patches for the component video post processing kernels included in the combined video post processing kernel;

copying the binaries to the allocated space; and applying the code patches.

11. The non-transitory machine readable medium of claim 9, wherein when executed the instructions further result in the computing device:

determining input register regions and output register regions for the component video post processing kernels included in the combined video post processing kernel and wherein the applying the code patches includes fixing the binaries to read input data from the input register regions and write output data to the output register regions.

12. The non-transitory machine readable medium of claim 9, wherein when executed the instructions further result in the computing device:

determining if sufficient space is available for the combined video post processing kernel; and if sufficient space is not available, deleting other combined video pot processing kernels.

13. The non-transitory machine readable medium of claim 9, wherein when executed the instructions further result in the computing device:

generating the plurality of component video post processing kernels, wherein each of the component video post processing kernels includes binaries with code patches that read data from a preceding kernel and write data into a successive kernel at runtime.

14. A non-transitory machine readable storage medium comprising:

a code patch generator to generate a plurality of component video post processing kernels, wherein each of the plurality of post processing kernels defines post processing functions to be performed;

a code manager to receive a request for a combined video post processing kernel, wherein the combined video post processing kernel identifies a plurality of component video post processing kernels and an order; and determine if the combined video post processing kernel is present; and a kernel composer to dynamically link and load the plurality of component video post processing kernels in the order identified to create the combined video post processing kernel if the code manager determines the combined video post processing kernel is not present.

15. The non-transitory machine readable storage medium of claim 14, wherein the code patch generator is to generate, for each of the plurality of video post processing kernels, binaries with code patches that read data from a preceding kernel and write data into a successive kernel at runtime.

16. The non-transitory machine readable storage medium of claim 14, wherein the code manager is further to determine if sufficient space is available for the combined video post processing kernel;

if sufficient space is available, allocate space for the combined video post processing kernel;

if sufficient space is not available, delete other combined video pot processing kernels.

17. The non-transitory machine readable storage medium of claim 16, wherein the code manager is to delete least recently used other combined video post processing kernels.

18. The non-transitory machine readable storage medium of claim 14, wherein the code manager is further to assign a unique identifier to the combined video post processing kernel.

19. The non-transitory machine readable storage medium of claim 14, wherein the kernel composer is to retrieve binaries and code patches for the component video post processing kernels included in the combined video post processing kernel;

copy the binaries to the allocated space; and apply the code patches.

20. The non-transitory machine readable storage medium of claim 19, wherein the kernel composer is further to determine input register regions and output register regions for the component video post processing kernels included in the combined video post processing kernel; and apply the code patches to fix the binaries to read input data from the input register regions and write output data to the output register regions.

* * * * *